United States Patent
Dessertenne

(10) Patent No.: US 12,397,931 B2
(45) Date of Patent: Aug. 26, 2025

(54) METHOD FOR MONITORING AN AIRCRAFTS AIR BLEED LINES

(71) Applicant: Airbus Operations SAS, Toulouse (FR)

(72) Inventor: Franck Dessertenne, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 350 days.

(21) Appl. No.: 18/295,455

(22) Filed: Apr. 4, 2023

(65) Prior Publication Data

US 2023/0322414 A1    Oct. 12, 2023

(30) Foreign Application Priority Data

Apr. 8, 2022  (FR) ...................................... 2203240

(51) Int. Cl.
*B64F 5/60*       (2017.01)
*B64D 45/00*    (2006.01)

(52) U.S. Cl.
CPC ............... *B64F 5/60* (2017.01); *B64D 45/00* (2013.01); *B64D 2045/0085* (2013.01)

(58) Field of Classification Search
CPC ... B64F 5/60; B64D 45/00; B64D 2045/0085; B64D 13/06; B64D 2013/0618; B64D 41/00; F05D 2220/50; F05D 2260/80; F05D 2270/3032; G01M 3/002; F02C 6/08

See application file for complete search history.

(56) References Cited

U.S. PATENT DOCUMENTS

| | | | | |
|---|---|---|---|---|
| 8,572,996 B2* | 11/2013 | Dittmar | .................. | B64D 13/06 62/236 |
| 9,823,154 B2* | 11/2017 | Norris | ..................... | G01K 13/02 |
| 2005/0051666 A1* | 3/2005 | Lee | ......................... | B64C 17/10 244/10 |
| 2009/0235670 A1* | 9/2009 | Rostek | ................... | B64D 13/02 60/785 |
| 2015/0344156 A1* | 12/2015 | Vail, III | ............... | G01R 31/008 701/32.8 |
| 2019/0300200 A1* | 10/2019 | Himmelmann | ........... | F02C 6/08 |
| 2022/0268657 A1* | 8/2022 | Ribeiro | ..................... | B64F 5/60 |

FOREIGN PATENT DOCUMENTS

| | | |
|---|---|---|
| DE | 102005049910 A1 | 4/2007 |
| FR | 3097963 A1 | 1/2021 |

\* cited by examiner

*Primary Examiner* — Hunter B Lonsberry
*Assistant Examiner* — Jalal C Coduroglu
(74) *Attorney, Agent, or Firm* — Greer, Burns & Crain, Ltd.

(57) ABSTRACT

A method for monitoring the integrity of a set of air bleed lines from propulsion engines of an aircraft by: at the start of a use of the aircraft, sending air from an auxiliary power unit into the various lines; over a predetermined period of time, acquiring temperature measurements from temperature sensors associated with the lines; for each line, determining a gradient for rate of change in temperature with respect to time during this period of time; determining a discrepancy between the gradient for rate of change in temperature with respect to time corresponding to a line and a gradient for rate of change in temperature with respect to time corresponding to at least one other line; determining a condition indicator for the condition of the line as a function of the discrepancy determined for said line.

10 Claims, 2 Drawing Sheets

METHOD FOR MONITORING AN AIRCRAFTS AIR BLEED LINES

CROSS-REFERENCES TO RELATED APPLICATIONS

This application claims the benefit of French Patent Application Number 22 03240 filed on Apr. 8, 2022, the entire disclosure of which is incorporated herein by way of reference.

FIELD OF THE INVENTION

The invention relates to the field of monitoring the operational condition of an aircraft.

BACKGROUND

Numerous aircraft comprise lines for bleeding air from the propulsion engines of said aircraft. These lines are known as bleed lines. The air thus bled from the engines is notably used to supply an aircraft cabin air conditioning system. These lines are also connected to an auxiliary power unit, or APU, which is an auxiliary generator of power so as to allow the propulsion engines to be started using compression air supplied by the APU.

When the aircraft is being operated by an airline, leaks may occur in the air bleed lines, particularly as a result of vibrations or following a maintenance operation. These lines are generally equipped with an OHDS (OverHeat Detection System) enabling leaks of hot air from said lines to be detected. However, because of mechanical integration constraints certain parts of the lines cannot be equipped with such an OHDS, particularly parts of the lines which are situated close to the engines. There is therefore a need to detect leaks in said parts of the lines as early as possible, especially given that these parts are generally difficult to access for visual inspection.

SUMMARY OF THE INVENTION

It is notably an objective of the present invention to afford a solution to this problem. The invention relates to a method for monitoring the integrity of a set of air bleed lines for bleeding air from propulsion engines of an aircraft, the aircraft further comprising an auxiliary power unit, each line extending at least between one of the propulsion engines and the auxiliary power unit, each line comprising a temperature sensor in a zone of said line situated close to the engine. The method may include the following steps implemented automatically:

A) at the start of each use of the aircraft from among a set of uses of the aircraft for which the auxiliary power unit is used when the aircraft is on the ground, starting the auxiliary power unit and sending air from the auxiliary power unit into the various lines of the set of lines;

B) during a predetermined period of time after the starting of the auxiliary power unit, repetitively acquiring temperature measurements from the temperature sensors of the various lines, at a predetermined periodicity;

C) for each line, as a function of the temperature measurements acquired in step B), determining a gradient for the rate of change in temperature with respect to time during this period of time;

D) for each line, determining a discrepancy between the gradient for the rate of change in temperature with respect to time corresponding to said line and a gradient for the rate of change in temperature with respect to time corresponding to at least one other line of the set of lines;

E) for each line, determining a condition indicator for said line as a function of the discrepancy determined in step D) for said line;

F) for each line, if the condition indicator determined in step E) is above a predetermined threshold, issuing an alert to the fact that the line has a leak.

Thus, the method according to the invention makes it possible to detect a leak in an air bleed line without the need for this line to be equipped with a specific leak detection system.

According to various embodiments which can be considered separately or in combination:

with the aircraft being a two-engine aircraft in which the set of air bleed lines comprises two lines each one associated with one of the two aircraft propulsion engines, for each of said two lines the discrepancy determined in step D) corresponds to a discrepancy between the gradient for rate of change in temperature with respect to time corresponding to this line and the gradient for rate of change in temperature with respect to time corresponding to the other line;

with the aircraft being a four-engine aircraft in which the set of air bleed lines comprises four lines each one associated with one of the four aircraft propulsion engines, for each of said four lines the discrepancy determined in step D) corresponds to a discrepancy between the gradient for rate of change in temperature with respect to time corresponding to this line and a median or a mean of the three gradients for rate of change in temperature with respect to time corresponding respectively to the other three lines;

the method further comprises:

a data logging step performed on board the aircraft, this data logging step consisting in logging at least the temperature measurements acquired in step B) or the gradients for rate of change in temperature with respect to time determined in step C) or the discrepancy determined in step D); and a step whereby said data is received by a computer situated on the ground, and at least steps E) and F) are performed by said computer situated on the ground;

step C) comprises a substep referred to as correction substep, consisting in correcting at least one of the gradients determined for the various lines so as to correct the effects that a difference in length between at least two lines of the set of lines has on this gradient;

the line condition indicator determined in step E) as function of the discrepancy determined in step D) corresponds to a median or to a mean of a set of discrepancies determined for said line for several successive uses of the aircraft over a first expanse of time. Advantageously, the set of deviations comprises the deviation determined in step D) as well as deviations determined for uses of the aircraft prior to the use of the aircraft for which the deviation is determined in step D). Advantageously also, the first expanse of time extends over several days;

the line condition indicator determined in step E) corresponds to the difference between, on the one hand, the discrepancy determined in step D) and, on the other hand, a median or a mean of a set of deviations determined for said line for several successive uses of the aircraft, over a second expanse of time prior, by a third expanse of time, to the use of the aircraft for which the deviation is determined in step D). Advantageously, the second expanse of time and the third expanse of time each extend over several days.

BRIEF DESCRIPTION OF THE DRAWINGS

The invention will be better understood from reading the following description and from studying the attached figures.

DETAILED DESCRIPTION OF THE PREFERRED EMBODIMENTS

Figure 1:
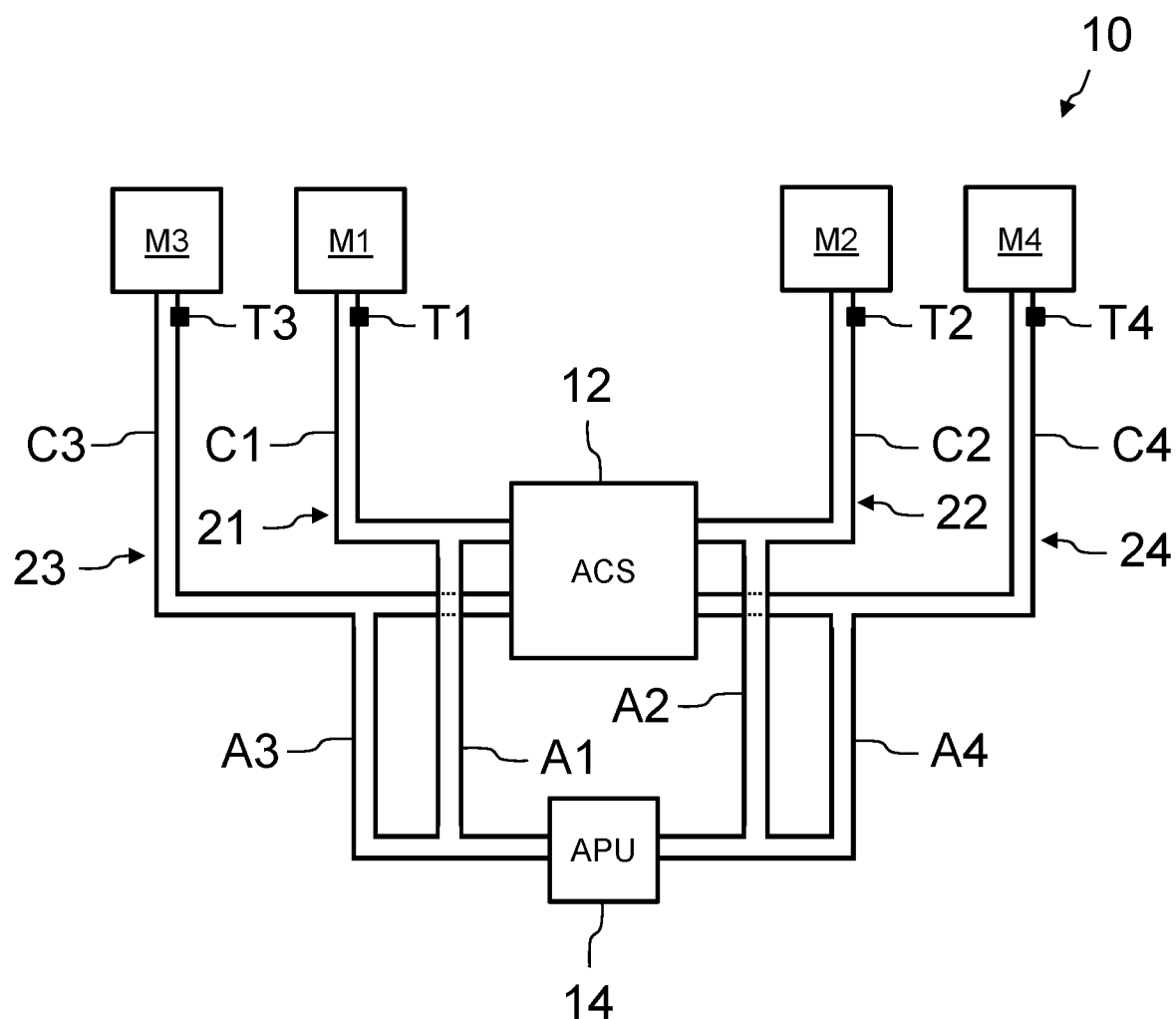
FIG. 1 schematically illustrates one embodiment of a system for distributing air in an aircraft.

The aircraft air distribution system 10 depicted in FIG. 1 comprises a set of air bleed lines 21, 22, 23, 24 for bleeding air from propulsion engines M1, M2, M3, M4 of the aircraft. The aircraft also comprises an auxiliary power unit 14, labelled APU in the figure, and an air conditioning system 12, labelled ACS in the figure. The lines 21, 22, 23, 24 each comprise a first part, respectively C1, C2, C3, C4 extending between, on the one hand, the propulsion engine M1, M2, M3, M4 to which this line is connected and, on the other hand, the air conditioning system 12. Furthermore, each of the lines 21, 22, 23, 24 comprises a second part, respectively A1, A2, A3, A4, extending between, on the one hand, the auxiliary power unit 14 and, on the other hand, the first part C1, C2, C3, C4 of said line. Each of the lines 21, 22, 23, 24 comprises a temperature sensor, T1, T2, T3, T4, respectively, in a zone of said line situated close to the propulsion engine to which this line is connected. In particular, the temperature sensor is positioned in a zone of the line situated close to a pylon used for attaching the propulsion engine. As a preference, this temperature sensor is a temperature sensor that already exists on the aircraft: there is therefore no need to add a sensor in order to implement the invention. As a further preference, a valve is installed in series on the line, between the temperature sensor and the engine. This valve is, for example, a pressure regulating valve.

Figure 2:
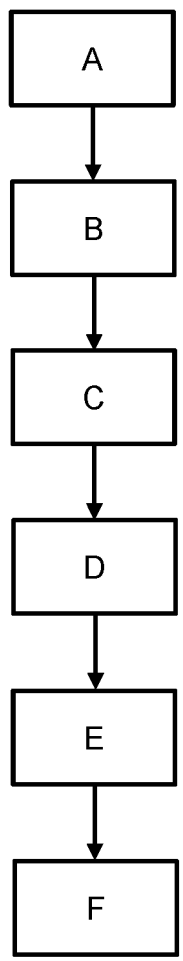
FIG. 2 illustrates a method for monitoring an aircraft's air bleed lines, according to one embodiment of the invention.

The method, illustrated in FIG. 2, for monitoring the integrity of the set of air bleed lines 21, 22, 23, 24 bleeding air from the propulsion engines of the aircraft, comprises a set of steps A) to F) which are implemented automatically.

In step A), at the start of each use of the aircraft from among a set of uses of the aircraft for which the auxiliary power unit 14 is used when the aircraft is on the ground, the auxiliary power unit 14 is started and air from the auxiliary power unit is sent into the various lines 21, 22, 23, 24 of the set of lines. More particularly, air from the auxiliary power unit 14 is sent into the second parts A1, A2, A3, A4 of said lines, then conveyed as far as the respective first parts C1, C2, C3, C4 of the lines and as far as the air conditioning system 12 so as to condition air of a passenger cabin of the aircraft. When the auxiliary power unit 14 is started at the start of a use of the aircraft, the propulsion engines M1, M2, M3, M4 are still stopped. The auxiliary power unit warms the ambient air which it sends into said lines. When the auxiliary power unit is started, the warming of the air is progressive, from the temperature of the ambient air up to a setpoint temperature. The phase during which the temperature of the air warmed by the auxiliary power unit and sent into the lines rises, extends over several minutes, for example 5 minutes.

In step B), during a predetermined period of time after the starting of the auxiliary power unit 14, a computer on board the aircraft repeatedly acquires temperature measurements from temperature sensors T1, T2, T3, T4 of the various lines, at a predetermined periodicity, for example every 10 to 15 seconds. The predetermined period of time is included within the aforementioned phase during which the temperature of the air warmed by the auxiliary power unit rises. This period of time lasts, for example, 5 minutes. As indicated previously, each sensor from among the sensors T1, T2, T3, T4 installed in one of the lines 21, 22, 23, 24 is situated in a zone of said line that is situated close to the propulsion engine to which this line is connected, particularly close to a pylon used for attaching the engine. The air from the auxiliary power unit 14 circulates along the line, between the auxiliary power unit 14 and the air conditioning system. As a preference, when the line has a valve between the temperature sensor and the engine, this valve is closed while temperature measurements are being acquired. Thus, in the absence of leaks from the line, the air from the auxiliary power unit circulates very little through the first part of the line, between the air conditioning system and the temperature sensor. However, the air already contained in this part of the line is progressively warmed on contact with the hot air sent by the auxiliary power unit to the air conditioning system. As a result, the temperature measured by the temperature sensor increases during the aforementioned period of time, as a function of the rise in temperature of the air sent by the auxiliary power unit, and also as a function of the length of the air circulation line. If there is a leak in a part of the line situated near the propulsion engine, particularly near a pylon used for attaching the propulsion engine, hot air from the auxiliary power unit circulates in the first part of the line between the air conditioning system and the temperature sensor. As a result, during the aforementioned period of time, the temperature measured by the temperature sensor increases far more rapidly than it would in the absence of a leak. The increase in the temperature measured by the temperature sensor is essentially a function of the air flow rate in the line as a result of the leak.

In step C), a computer determines, for each line, a gradient for the rate of change in temperature with respect to time during said period of time as a function of the temperature measurements acquired in step B). This gradient is for example determined by a computer using a linear regression method.

In step D), a computer determines, for each line, a discrepancy between the gradient for the rate of change in temperature with respect to time corresponding to said line and a gradient for the rate of change in temperature with respect to time corresponding to at least one other line of the set of lines. As previously indicated, the gradient for rate of change with respect to time for one line corresponds to a rise in temperature which is a function, on the one hand, of the rise in temperature of the air sent by the auxiliary power unit and, on the other hand, of the length of the air circulation line and of the flow rate of the air in said line.

In one particular embodiment, step D) further comprises a substep of filtering out the noise from the discrepancy thus determined, this noise notably corresponding to noise on the measurements acquired in step B) or else to residual leaks in the lines in the absence of defects with said lines, etc. During the filtering, a nil value is assigned to the discrepancies the absolute value of which is below a predetermined noise threshold.

Advantageously, when two lines of the set of lines have substantially different lengths, step C) comprises a substep known as the correction substep, which consists in correcting at least one of the gradients determined for these lines, so as to correct for the effects that the difference in length between the two lines of the set of lines has on this gradient.

Given that air is sent into the various lines by the one same auxiliary power unit, the gradient for the rise in temperature of the air sent by the auxiliary power unit does have an influence on the gradient for the rate of change in temperature with respect to time as measured for each line considered individually, but it has very little influence on the discrepancy between the gradients for rate of change in temperature with respect to time as measured for two lines. Furthermore, when the lines are of substantially equal lengths, the length of the lines has no influence on the discrepancy between the gradients for rate of change in temperature with respect to time as measured for two lines. The same is true when two lines are of different lengths and one of the gradients is corrected in the aforementioned substep of step C). Therefore, the discrepancy between the gradients for rate of change in temperature with respect to time as measured for two lines varies only as a function of the respective air flow rates in the two lines. In the absence of leakage in one of the lines, these flow rates are similar and therefore the value of the discrepancy is close to zero. In the event of a leak in part of a line situated close to the propulsion engine to which this line is connected, particularly close to an engine attachment pylon, the flow rate of the air in the line increases and therefore hot air reaches the temperature sensor more rapidly. The same thing happens if there is an air leak in equipment connected to the line, close to the propulsion engine or to an engine attachment pylon. Such equipment corresponds for example to an air precooler that cools air. As a result, such an air leak leads to an increase in the temperature rise gradient for this line. The result of this is that the discrepancy between this temperature rise gradient and a temperature rise gradient determined for another line of the set of lines is then above a predetermined value.

In step E), a computer determines, for each line, an indicator of the condition of said line as a function of the discrepancy determined in step D) for said line. The condition indicator determined for one line is, in absolute value, below a predetermined threshold when it corresponds to an absence of a leak from the line. The condition indicator is, in absolute value, above the predetermined threshold when it corresponds to a leak from the line. In particular, the determination of the condition indicator in step E) relies on a history of discrepancy values determined in step D).

In a first alternative, the line condition indicator determined in step E) as a function of the discrepancy determined in step D) corresponds to a median or to a mean of a set of discrepancies determined for said line for several successive uses of the aircraft over a first expanse of time. This set of discrepancies comprises the discrepancy determined in step D), for one considered use of the aircraft, together with discrepancies determined for uses of the aircraft prior to the considered use of the aircraft for which the discrepancy is determined in step D). In particular, the first expanse of time extends over several days, for example over 7 days. Therefore, the first expanse of time extends between 1 day and 7 days prior to the considered use of the aircraft. Using the median or the mean of the deviations determined during this first range of time which extends over several days as the indicator of condition makes it possible to detect a leak corresponding to a slow degradation of the air line or of an item of equipment connected to the line, before this degradation leads to damage to the surroundings of the line. In practice, slow degradation corresponds for example to a leak from an air precooler connected to the line, in a part of the line situated close to a propulsion engine or to an engine attachment pylon of the aircraft.

According to a second alternative, the line condition indicator determined in step E) corresponds to the difference between, on the one hand, the discrepancy determined in step D) and, on the other hand, a median or a mean of a set of discrepancies determined for said line for several successive uses of the aircraft over a second expanse of time that is a third expanse of time prior to the considered use of the aircraft for which the discrepancy is determined in step D). In particular, the second expanse of time and the third expanse of time each extend over several days. For example, the second expanse of time extends over 14 days and the third expanse of time extends over 7 days. Therefore, the second expanse of time then extends between 8 days and 21 days prior to the considered use of the aircraft. The third expanse of time is chosen to be long enough for the second expanse of time to be able to be considered to be sufficiently prior to the considered use of the aircraft for which the discrepancy is determined in step D) so that even if rapid degradation of the line occurs during said considered use of the aircraft, the line had not yet degraded during the second expanse of time. The median or the mean of the set of deviations determined for the line for several successive uses of the aircraft over the second expanse of time thus corresponds to a reference value for the deviation in the absence of line degradation. As a result, the line condition indicator determined in step E) corresponds to the difference between, on the one hand, the discrepancy determined in step D) for the considered use of the aircraft and this reference value of the deviation. In the absence of a leak from the line during the considered use of the aircraft, the value of the condition indicator is substantially nil, which is to say in absolute value below a predetermined threshold. The value of the predetermined threshold is selected such that, in the event of a leak during the considered use of the aircraft, the value of the condition indicator is above the predetermined threshold. Because the condition indicator is calculated as a difference between the discrepancy determined in step D) for the considered use of the aircraft and said reference value of the discrepancy (during the second expanse of time), this second alternative makes it possible to determine a leak corresponding to a rapid degradation of the line or to an item of equipment connected to the line, during said considered use of the aircraft. In practice, rapid degradation corresponds for example to a leak from the line itself.

In particular, the method comprises both calculating a line condition indicator according to the first alternative and calculating a line condition indicator according to the second alternative. That makes it possible to detect line leaks corresponding both to slow degradations of the line and to rapid degradations of the line. The values of the predetermined threshold for the first alternative and for the second alternative may differ. For example, a person skilled in the art adjusts these values experimentally. In practice, given that in the second alternative the condition indicator is calculated as the difference between, on the one hand, the discrepancy determined only for the considered use of the aircraft and, on the other hand, said reference value of the discrepancy, in order to avoid inappropriate leak detections, the value of the threshold corresponding to this second alternative is chosen as higher than the value of the threshold corresponding to the first alternative.

In step F), for each line, a computer issues an alert to the fact that the line has a leak if the condition indicator determined in step E) is above the predetermined threshold. This allows a maintenance operator to be sent in to repair the line before the hot air leak leads to damage to the surroundings of the line.

According to a first alternative, the method is implemented on board the aircraft. The computers mentioned in steps B) to F) then correspond to one or more computers carried on board the aircraft. In one embodiment, these computers then correspond to an aircraft maintenance computer. In another embodiment, the computer mentioned in step B) corresponds to a computer of a flight data logger of the aircraft and the computers mentioned in steps C) to F) correspond to an aircraft maintenance computer.

According to a second alternative, the method further comprises:
- a data logging step implemented on board the aircraft, this data logging step consisting in logging at least the temperature measurements acquired in step B) or the gradients for the rate of change in temperature with respect to time determined in step C) or the discrepancy determined in step D); and
- a step whereby said data is received by a computer situated on the ground.

At least steps E) and F) are then implemented by the computer situated on the ground. Thus, in one embodiment, the temperature measurements acquired in step B) are logged by a computer carried on board the aircraft, for example a computer of the aircraft's flight data logger. These measurements are transmitted to the ground via a communications system of the aircraft and are received by a computer situated on the ground, for example a computer of a maintenance center of the airline operating the aircraft. This computer then implements steps C) to F). In another embodiment, steps B) and C) are implemented by the one same computer carried on board the aircraft which in step B) acquires the measurements from the temperature sensors and in step C) determines the gradients for the rate of change in temperature with respect to time and logs the values of said gradients in a memory carried on board the aircraft, for example in a flight data logger. The values of the gradients are then transmitted to the ground as in the previous embodiment, and the ground computer implements steps D) to F).

The aforementioned various embodiments are given solely by way of example and are not limiting of the invention. Other distributions of the computers mentioned in steps B) to F) are possible without departing from the scope of the invention, whether this be distributions between computers carried on board the aircraft or between computers situated on the ground.

In one particular embodiment, when the aircraft is a four-engine aircraft in which the set of air bleed lines comprises four lines 21, 22, 23, 24, each one associated with one of the four propulsion engines M1, M2, M3, M4 of the aircraft, for each of said four lines the discrepancy determined in step D) corresponds to a discrepancy between the gradient for rate of change in temperature with respect to time corresponding to this line and a median or a mean of the three gradients for rate of change in temperature with respect to time corresponding respectively to the other three lines.

In one particular embodiment, when the aircraft is a two-engine aircraft in which the set of air bleed lines comprises two lines 21, 22 each one associated with one of the two propulsion engines M1, M2 of the aircraft, for each of said two lines the discrepancy determined in step D) corresponds to a discrepancy between the gradient for rate of change in temperature with respect to time corresponding to this line and the gradient for rate of change in temperature with respect to time corresponding to the other line.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CD-ROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for monitoring the integrity of a set of air bleed lines for bleeding air from propulsion engines of an aircraft, the aircraft further comprising an auxiliary power unit, each air bleed line extending at least between one of the propulsion engines and the auxiliary power unit, each line comprising a temperature sensor in a zone of said line situated closer to the propulsion engine then to the auxiliary power unit, the method comprising the following steps implemented automatically:
  A) at the start of each use of the aircraft from among a set of uses of the aircraft for which the auxiliary power unit is used when the aircraft is on the ground, starting the auxiliary power unit and sending air from the auxiliary power unit into the air bleed lines of the set of air bleed lines;
  B) during a predetermined period of time after the starting of the auxiliary power unit, repetitively acquiring temperature measurements from the temperature sensors of the air bleed lines, at a predetermined periodicity;
  C) for each air bleed line, as a function of the temperature measurements acquired in step B), determining a gradient for a rate of change in temperature with respect to time during the predetermined period of time;
  D) for each air bleed line, determining a discrepancy between the gradient for the rate of change in temperature with respect to time corresponding to said air bleed line and a gradient for the rate of change in temperature with respect to time corresponding to at least one other air bleed line of the set of air bleed lines;
  E) for each air bleed line, determining a condition indicator for said air bleed line as a function of the discrepancy determined in step D) for said air bleed line; and,
  F) for each air bleed line, when the condition indicator determined in step E) is above a predetermined threshold, issuing an alert to the air bleed line has a leak.

2. The method according to claim 1, wherein, with the aircraft being a two-engine aircraft with two propulsion engines in which the set of air bleed lines comprises two air bleed lines each one associated with one of the two propulsion engines, for each of said two air bleed lines the discrepancy determined in step D) corresponds to a discrepancy between the gradient for rate of change in temperature with respect to time corresponding to this line and the gradient for rate of change in temperature with respect to time corresponding to the other air bleed line.

3. The method according to claim 1, wherein, with the aircraft being a four-engine aircraft with four propulsion engines in which the set of air bleed lines comprises four air bleed lines each one associated with one of the four aircraft propulsion engines, for each of said four air bleed lines the discrepancy determined in step D) corresponds to a discrepancy between the gradient for rate of change in temperature with respect to time corresponding to this line and a median or a mean of the three gradients for rate of change in temperature with respect to time corresponding respectively to the other three air bleed lines.

4. The method according to claim 1, further comprising:
  a data logging step performed on board the aircraft, the data logging step comprising logging at least the temperature measurements acquired in step B), the gradients for rate of change in temperature with respect to time determined in step C), the discrepancy determined in step D), or a combination thereof; and
  a step whereby said data is received by a computer situated on the ground, and in that at least steps E) and F) are performed by said computer situated on the ground.

5. The method according to claim 1, wherein step C) comprises a substep referred to as correction substep, comprising correcting at least one of the gradients determined for the various air bleed lines so as to correct an effect that a difference in length between at least two air bleed lines of the set of air bleed lines has on the at least one gradient.

6. The method according to claim 1, wherein the line condition indicator determined in step E) as a function of the discrepancy determined in step D) corresponds to a median or to a mean of a set of discrepancies determined for said air bleed line for several successive uses of the aircraft over a first expanse of time.

7. The method according to claim 6, wherein the set of discrepancies comprises the deviation determined in step D) as well as deviations determined for uses of the aircraft prior to the use of the aircraft for which the deviation is determined in step D).

8. The method according to claim 7, wherein the first expanse of time extends over several days.

9. The method according to claim 1, wherein the line condition indicator determined in step E) corresponds to a difference between, on one hand, the discrepancy determined in step D) and, on the other hand, a median or a mean of a set of deviations determined for said air bleed line for several successive uses of the aircraft, over a first expanse of time prior, by a second expanse of time, to the use of the aircraft for which the deviation is determined in step D).

10. The method according to claim 9, wherein the first expanse of time and the second expanse of time each extend over several days.

* * * * *